United States Patent
Jones

(10) Patent No.: US 6,492,755 B1
(45) Date of Patent: Dec. 10, 2002

(54) ELECTRIC MOTOR

(75) Inventor: Sigismund Jones, Neu-Anspach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/521,272

(22) Filed: Mar. 8, 2000

(30) Foreign Application Priority Data

Mar. 13, 1999 (DE) .......................... 199 11 261

(51) Int. Cl.$^7$ ................................. H02K 21/12
(52) U.S. Cl. ...................... 310/156.12; 310/156.16
(58) Field of Search ..................... 310/156.01, 216, 310/218, 261, 269, 152, 91, 156.08, 156.12, 156.13–156.16, 156.17, 156.18, 156.19, 156.26, 126.31; 29/598

(56) References Cited

U.S. PATENT DOCUMENTS

| | | | | |
|---|---|---|---|---|
| 4,012,651 A | * | 3/1977 | Burson ................ | 310/156 |
| 4,137,884 A | * | 2/1979 | Odazima et al. ........ | 123/149 D |
| 4,389,589 A | | 6/1983 | Schustek ............. | 310/258 |
| 4,855,630 A | | 8/1989 | Cole ................. | 310/156 |
| 4,954,736 A | * | 9/1990 | Kawamoto et al. ...... | 310/156 |
| 4,973,872 A | | 11/1990 | Dohogne ............. | 310/156 |
| 5,723,929 A | * | 3/1998 | Niimi ................ | 310/154 |

FOREIGN PATENT DOCUMENTS

| | | |
|---|---|---|
| DE | 3622231 | 1/1988 |
| EP | 0410048 | 1/1991 |
| EP | 0459355 | 12/1991 |
| FR | 2606949 | 5/1988 |

OTHER PUBLICATIONS

Patent Abstracts of Japan vol. 1998, No. 4, Mar. 31, 1998—& JP 09 322446A; Shibaura Eng Works Co Ltd, Dec. 12, 1997.

Patent Abstracts of Japan vol. 1996, No. 12, Dec. 26, 1996—& JP 08 223835; Honda Motor Co Ltd, Aug. 30, 1996.

* cited by examiner

*Primary Examiner*—Nestor Ramirez
*Assistant Examiner*—Dang Dinh Le
(74) *Attorney, Agent, or Firm*—Martin A. Farber

(57) ABSTRACT

In an electric motor, a plurality of magnet shells (4, 6) arranged on a rotor (2) is preloaded against the core (8) by springs (11, 13) which engage in a core (8) of the rotor (2). The springs (11, 13) have a shape which corresponds to the magnet shells (4, 6). The magnet shells (4, 6) are thereby secured reliably by form fitting on the rotor (2). This also makes the electric motor particularly favorable in terms of cost.

14 Claims, 2 Drawing Sheets

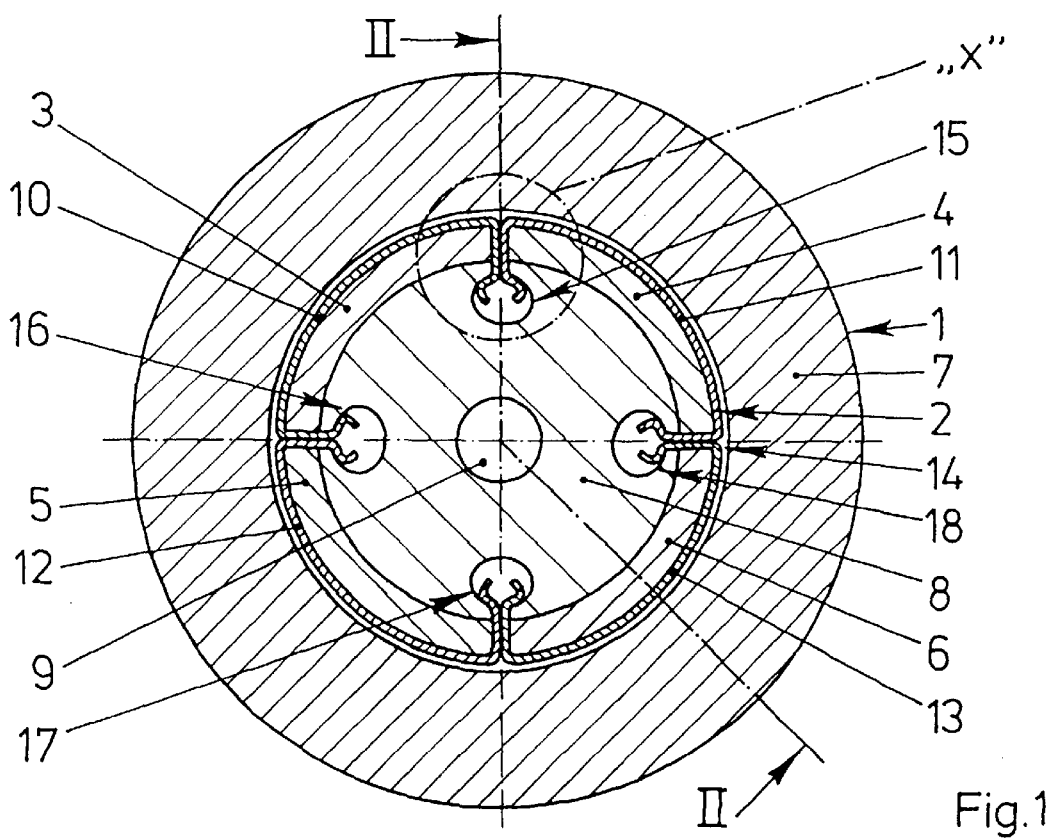
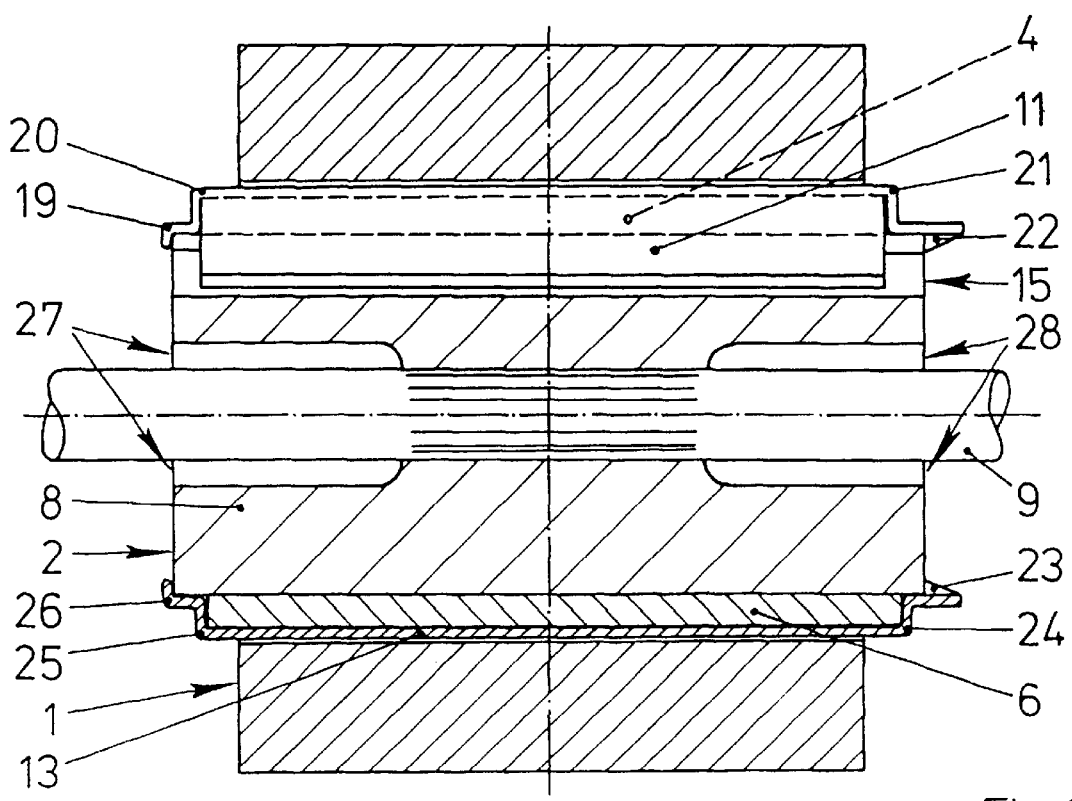

ELECTRIC MOTOR

FIELD AND BACKGROUND OF THE INVENTION

The invention relates to an electric motor with a rotor which has a plurality of individual, mutually separate, permanent-magnetic magnet shells, with a stator having coils arranged concentrically around the rotor, and with a retention element for preloading the magnet shells against a core of the rotor.

Such electric motors are frequently referred to as internal-rotor motors and are known in the industry. The retention element of the electric motor known in the industry is designed as a thin-walled sleeve manufactured from a non-magnetic material. Since permanent magnets are generally produced from a low-cost and brittle material, the magnet shells have only a low inherent strength and tend to crack. The sleeve prevents the magnets from being destroyed during transportation or operation and coming away completely or partially from the rotor due to centrifugal forces in operation. A magnetic short circuit between the magnets is prevented by the non-magnetic configuration of the sleeve. Since the coils are arranged on the stator, this electric motor does not need any fault-prone carbon brushes to transmit electrical energy to the coils.

One disadvantage with the known electric motor is that, despite narrow tolerances of the sleeve and of the core of the rotor, the magnet shells can be displaced. In the worst case, two magnet shells come into contact as a result and form a magnetic short circuit. This leads to a sharp reduction in the power of the electric motor. The magnet shells are therefore frequently bonded adhesively to the core of the rotor and the sleeve. Due to this configuration, the electric motor requires involved and very costly assembly to ensure reliable attachment of the magnet shells to the rotor.

SUMMARY OF THE INVENTION

The object on which the invention is based is to configure an electric motor of the type stated at the outset in such a way that the magnets are held in a particularly reliable manner on the rotor and that it can be produced at as reasonable a cost as possible.

According to the invention, this problem is solved by virtue of the fact that the retention element has a plurality of springs which engage in the core of the rotor and are intended to preload the magnet shells against the core, and that the springs and/or the core have a shape which corresponds in the axial and radial direction to the magnet shells.

By virtue of this configuration, the magnets are secured reliably on the rotor by form-fitting after the installation of the springs. The shape of the springs or of the core of the rotor can be made to correspond to that of the magnet shells in the axial and radial directions if, for example, the springs are made to fit round the magnet shells in a clip-like manner or by providing a hollow in the core to accommodate the magnet shells. The invention ensures that the magnet shells are secured in a highly reliable manner without being bonded adhesively to the rotor. As a result, the electric motor according to the invention can be produced at particularly reasonable cost.

According to an advantageous development of the invention, the springs are held reliably on the core of the rotor after the assembly of the electric motor if the core of the rotor has, parallel to its axis of rotation, grooves with undercuts to accept hooks of the springs.

According to another advantageous development of the invention, two adjacent springs hold each other in their envisaged position on the rotor if respective pairs of contiguous hooks of two springs are arranged in a common groove.

If the number of magnet shells is large, the springs could each preload a plurality of magnet shells against the core of the rotor. In the extreme case, a single spring fitting round the entire rotor can be sufficient to preload all the magnet shells. According to another advantageous development of the invention, however, the magnet shells are held in a particularly reliable manner in their envisaged position if each of the magnet shells is assigned a single spring.

The springs of two adjacent magnet shells could, for example, be manufactured from a material of good magnetic conductivity and be spaced apart to avoid a magnetic short circuit in their adjoining regions. A magnetic short circuit would lead to impairment of the power of the electric motor. However, the springs can touch one another without the risk of a magnetic short circuit if they are manufactured from a material of poor magnetic conductivity. This allows the springs to be supported on one another, making the rotor particularly sturdy.

According to another advantageous development of the invention, the core of the rotor has a particularly low weight if the core of the rotor is manufactured from ferromagnetic sintered metal. The low weight of the core gives the rotor a low inertia. Moreover, this allows the core to be configured in almost any desired manner at a reasonable cost and, for example, to be provided with recesses in its ends to further reduce its weight.

According to another advantageous development of the invention, the corresponding shape of the springs to the magnet shells can be produced in a simple manner if the springs are longer than the magnet shells and if the springs have projections which correspond in shape to the magnet shells.

It helps to simplify the assembly of the electric motor according to the invention if the projections are of lug-shaped configuration. In this case, the lug-shaped projections can serve as a stop. As an alternative, it is also possible for the lug-shaped projections to swivel from a position in which they release the magnet shells into a position in which they engage behind them.

According to another advantageous development of the invention, the projections can be produced in a very simple manner after their mounting on the rotor if the projections are designed as flanges.

The mounting of the magnet shells in their envisaged position is particularly simple if, in the regions of the springs in which they adjoin the hooks, the springs have a bow bent transversely to the axis of rotation of the rotor and a flattened ramp adjoining the latter. In this arrangement, the shaping of the bow means that it has spring properties for preloading the magnet shells. This also makes the electric motor according to the invention suitable for use in a liquid medium because of the favorable shape of the rotor in terms of flow.

BRIEF DESCRIPTION OF THE DRAWINGS

The invention allows of numerous embodiments. To further clarify their basic principle, one of them is shown in the figures of the drawings and described below. In the drawings, FIG. 1 shows a cross section through an electric motor according to the invention, FIG. 2 shows the electric motor according to the invention from FIG. 1 in a longitudinal section along the line II—II.

DETAILED DESCRIPTION OF THE PREFERRED EMBODIMENT

Figure 3:
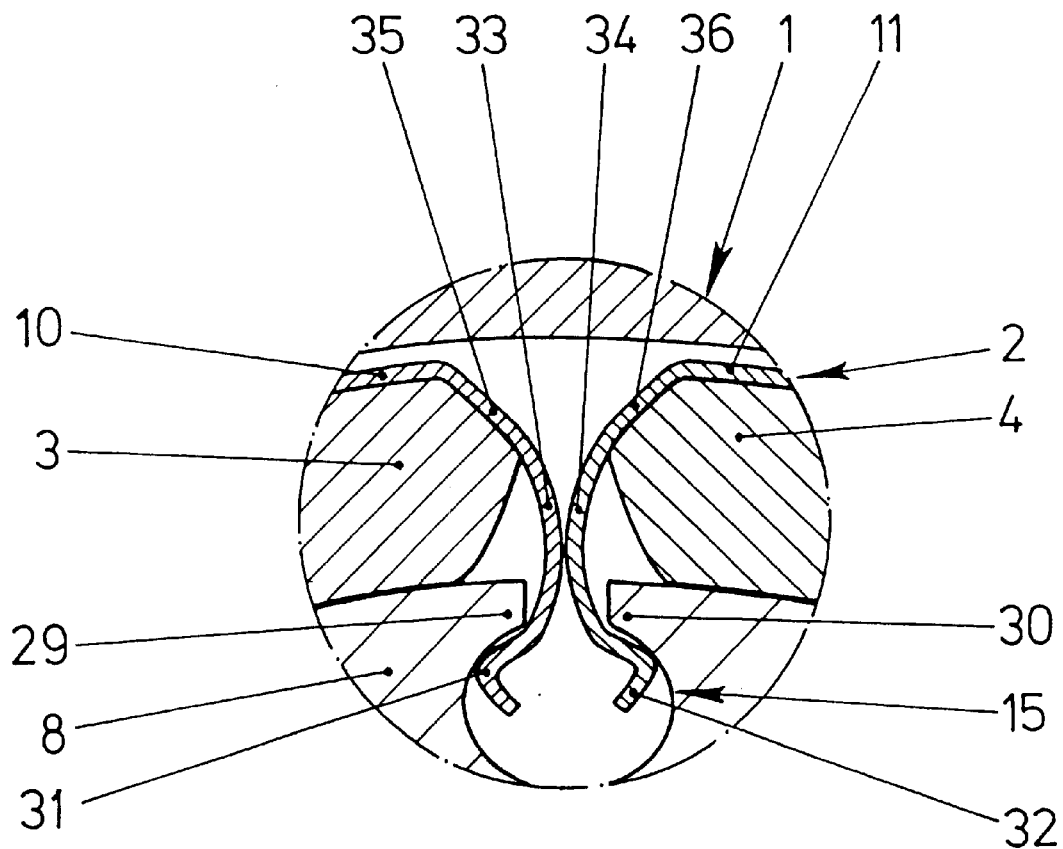
FIG. 3 shows a greatly enlarged representation of the detail "X" from FIG. 1.

FIG. 1 shows schematically a cross section through an electric motor according to the invention with a tubular stator 1 and with a cylindrical rotor 2. The stator 1 has coils 7 situated opposite magnet shells 3–6 of the rotor 2. The rotor 2 is secured with a core 8 of sintered metal on a rotatable shaft 9. The magnet shells 3–6 are preloaded against the core by a retention element 14. The retention element 14 has a spring 10–13 for each of the magnet shells 3–6. For form-fitting retention of the springs 10–13, the core 8 of the rotor 2 has grooves 15–18 extending parallel to its axis of rotation.

FIG. 2 shows the electric motor from FIG. 1 in a sectional representation along the line II—II. Here, it can be seen that the springs 11, 13 each have at their ends projections 19–26 designed as flanges and lugs. Respective pairs of projections 20, 21, 24, 25 designed as flanges rest against the magnets 4, 6. The springs 11, 13 therefore have a form corresponding to that of the magnet shells 4, 6. The projections 22, 23 designed as lugs and the projections 19, 26 resting against the core 8 of the rotor 2 and designed as flanges secure the springs 11, 13 in their axial position together with the magnet shells 4, 6. FIG. 2 also shows that the core 8 of the rotor 2 has at its ends recesses 27, 28 which adjoin the shaft 9.

In a greatly enlarged view of the detail "X" from FIG. 1, FIG. 3 shows how the springs 10, 11 are secured on the core 8 of the rotor 2. It can be seen here that the grooves 15 in the core 8 have undercuts 29, 30, behind which hooks 31, 32 of the springs 10, 11 engage. The magnet shells 3, 4 are thereby preloaded against the core 8 of the rotor 2. FIG. 3 furthermore shows that the two adjacent springs 10, 11 are supported on one another. In their regions adjoining the hooks 31, 32, the springs 10, 11 have a bow 33, 34 bent transversely to the axis of rotation of the rotor 2 and an adjoining, flattened ramp 35, 36.

I claim:

1. An electric motor with a rotor which has a plurality of individual, mutually separate, permanent-magnetic magnet shells, with a stator having coils arranged concentrically around the rotor, and with a retention element for preloading the magnet shells against a core of the rotor, wherein the retention element (14) comprises a plurality of springs (10–13) which engage in the core (8) of the rotor (2) without additional retention element and press the magnet shells (3–6) against the core (8), and wherein the springs (10–13) and/or the core (8) have a shape which corresponds in axial and radial direction to the magnet shells (3–6), wherein respective pairs of contiguous hooks (31, 32) of two said springs (10–13) are arranged in a common groove (15–18).

2. The electric motor as claimed in claim 1, wherein said core (8) of the rotor (2) has, parallel to its axis of rotation, said grooves (15–18) with undercuts (29, 30) receiving the hooks (31, 32) of the springs (10–13).

3. The electric motor as claimed in claim 1, wherein each of the magnet shells (3–6) is coordinated to one of said springs (10–13).

4. The electric motor as claimed in claim 1, wherein the springs (10–13) are made from a material of poor magnetic conductivity.

5. The electric motor as claimed in claim 1, wherein the core (8) of the rotor (2) is made from ferromagnetic sintered metal.

6. The electric motor as claimed in claim 1, wherein the springs (10–13) are longer than the magnet shells (3–6) and wherein the springs (10–13) have projections (19–26) for a shape which corresponds to that of the magnet shells (3–6).

7. The electric motor as claimed in claim 6, wherein the projections (22, 23) are of lug-shaped configuration.

8. The electric motor as claimed in claim 6, wherein the projections (19–21, 24–26) are formed as flanges.

9. The electric motor as claimed in claim 1, wherein, in regions of the springs (10–13) in which the springs adjoin the hooks (31, 32), the springs (10–13) have a bow (33, 34) bent transversely to an axis of rotation of the rotor (2) and a flattened ramp (35–36) adjoining the latter.

10. The electric motor as claimed in claim 9, wherein said contiguous hooks abut said core in said common groove with V-shaped backs of said hooks freely in a mirror-symmetrical arrangement.

11. The electric motor as claimed in claim 10, wherein said V-shaped backs of said hooks abut a radially far side of said common groove.

12. The electric motor as claimed in claim 1, wherein for each of the magnetic shells (3–6) there is exactly one of said springs.

13. The electric motor as claimed in claim 1, wherein each of the magnet shells (3–6) is fixedly held against rotational force of the rotor by respective said springs hooking into the common grooves of said core.

14. An electric motor with a rotor which has a plurality of individual, mutually separate, permanent-magnetic magnet shells, with a stator having coils arranged concentrically around the rotor, and with a retention element for preloading the magnet shells against a core of the rotor, wherein the retention element (14) has a plurality of springs (10–13) which engage in the core (8) of the rotor (2) and are to preload the magnet shells (3–6) against the core (8), and wherein the springs (10–13) and/or the core (8) have a shape which corresponds in axial and radial direction to the magnet shells (3–6), wherein respective pairs of contiguous hooks (31, 32) of two said springs (10–13) are arranged in a common groove (15–18), wherein said hooks of said springs freely hook into said common groove in said core preloading the magnet shells against the core.

\* \* \* \* \*